United States Patent [19]

Chivers

[11] 4,376,973
[45] Mar. 15, 1983

[54] IMPROVEMENTS IN OR RELATING TO DIGITAL DATA PROCESSING APPARATUS

[75] Inventor: Howard R. Chivers, Highnam, England

[73] Assignee: The Secretary of State for Defence in Her Britannic Majesty's Government of the United Kingdom of Great Britain and Northern Ireland, London, England

[21] Appl. No.: 119,726

[22] Filed: Feb. 8, 1980

[30] Foreign Application Priority Data

Feb. 13, 1979 [GB] United Kingdom ................. 7905022

[51] Int. Cl.³ ........................... G06F 9/22; G06F 9/28
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,219,980 | 11/1965 | Griffith et al. | 364/200 |
| 3,348,210 | 10/1967 | Ochsner | 364/200 |
| 3,528,062 | 9/1970 | Lehman et al. | 364/200 |
| 3,573,736 | 4/1971 | Schlaeppi | 364/200 |
| 3,941,989 | 3/1976 | McLaughlin | 364/900 |
| 3,961,312 | 6/1976 | Bodner et al. | 364/200 |
| 3,962,682 | 6/1976 | Bennett | 364/200 |
| 3,962,685 | 6/1976 | Isle | 364/200 |
| 4,051,326 | 9/1977 | Badagnani | 364/900 |
| 4,064,486 | 12/1977 | Faber | 340/147 SY |
| 4,096,566 | 6/1978 | Borie et al. | 364/200 |
| 4,099,241 | 7/1978 | Ossfeldt | 364/200 |
| 4,123,794 | 10/1978 | Matsumoto | 364/200 |
| 4,149,242 | 4/1979 | Pirz | 364/200 |
| 4,181,936 | 1/1980 | Kober | 364/200 |

FOREIGN PATENT DOCUMENTS

1318233   5/1973   United Kingdom .

OTHER PUBLICATIONS

Chao et al., "Duplexing Mobidic Computers", Automatic Control, Dec. 1959, pp. 46-52.
Holt et al., "A Software Development System for Microcomputers", IEEE Transactions, vol. IECI-22, 8/75, pp. 279-282.
Lorin, "Parallelism in Hardware and Software", 1972, pp. 266-268.

*Primary Examiner*—James D. Thomas
*Assistant Examiner*—David Y. Eng
*Attorney, Agent, or Firm*—Pollock, Vande Sande & Priddy

[57] ABSTRACT

A modular data processing unit is adapted to form part of a processing system comprising a plurality of such processing units connected in master-slave relationship. Each processing unit comprises a control section responsive to a control instruction to perform the execution of a program stored therein and to switch the processing unit to an idle mode on completion of the program execution, an internal memory section including an area of read/write memory; a computation section for performing calculations in accordance with the program instructions during which it can access the internal memory; and interface means through which the processor unit can be connected as a master unit to one or more slave units to monitor and control, and to access the internal memories of the slave units while it is executing a program, and through which it can be connected as a slave to a master processing unit by which it can thus be monitored and controlled, and have its internal read/write memory accessed. In such a multi-processor system, a master unit may be connected to a number of slave units each programmed to carry out a particular function, and in turn each of these slave units may be connected as a master to its own set of slave units, again each programmed to perform a particular function; the whole system being coordinated and controlled by the original master unit.

10 Claims, 3 Drawing Figures

IMPROVEMENTS IN OR RELATING TO DIGITAL DATA PROCESSING APPARATUS

This invention relates to digital data processing apparatus.

The invention is particularly though not exclusively concerned with digital data processing apparatus suitable for special purpose signal processing applications in which the amount of computing power is substantially more than can be obtained from a single bit-slice central processing unit (CPU).

BACKGROUND OF THE INVENTION

It is accepted that considerable savings in the cost and size of high power special purpose signal processors could be achieved if it were possible to effectively use current highly integrated components such as bit-slice CPUs. The reason for this is that these more highly integrated components are considerably cheaper per gate than the medium and large scale discrete integrated circuit combinations from which special purpose hardware signal processors are usually constructed, even allowing a substantial factor for inefficiency in using those gates. On the other hand, a special purpose signal processor is almost inevitably more efficient in dealing with signal processing problems than a general purpose computer, because the latter incurs speed penalties in the serial nature of its operations and fairly high hardware overheads because of its generality (eg the need to be able to store and load programs).

However, difficulties do arise in the use of highly integrated components such as bit-slice CPU devices in any application where the amount of computing power is substantially more than can be obtained from a single CPU device. The main difficulty is in the definition of an architecture in which a number of such devices can cooperate to produce the necessary computing power without high overheads or complex operating systems. There are also associated practical difficulties of programming a complex multiple processor system and in maintaining the system when constructed.

It is an object of the present invention to provide means whereby at least some of the above-mentioned disadvantages may be overcome or at least substantially reduced.

SUMMARY OF THE INVENTION

According to the present invention, a data processing unit comprises:

a control section responsive to a control instruction to switch the processing unit from an idle mode (as hereinafter defined) to an execution mode, the control section being operative during the execution mode to initiate and control the sequence of execution of a program stored therein and to automatically switch the processor unit to the idle mode when execution of the program is completed;

a memory section including an area of read/write memory;

a computation section for performing calculations in accordance with instructions from the program and capable of accessing the read/write memory area during execution of the program;

and interface means through which the processing unit can access an external memory when in its execution mode, through which at least part of the read/write memory area of processor unit can be accessed when in its idle mode, and through which an instruction for switching the processing unit from its idle to its execution mode can be received.

Thus, data on which the processing unit is to perform its computations in accordance with the program stored in its control section may be loaded into the read/write memory area from outside via the interface means when the processing unit is idle prior to initiation by the start instruction. In the course of execution of the program, this data may be read from the read/write memory area by the control section, and calculations performed on it before the "answer" is written back into the read/write memory area. In the course of executing the program, the processing unit may also access an external memory via its interface means either to write data into it or to read data from it. When the processor unit has completed execution of the program, and is switched to its idle mode, the internal read/write memory may then be accessed from outside, via the external bus system, eg to recover the "answer". Alternatively, the processing unit may write the data into an external memory before switching to its idle mode.

Because a processing unit in accordance with the invention can both access an external memory when in its execution mode, and have its read/write memory area accessed when in its idle mode, the interface units of two such processing units may be connected together so that one of them, when in its execution mode, can access the internal read/write memory area of the other when in its idle mode.

The interface means may conveniently comprise a master interface unit for connecting the processing unit to an address bus through which the processing unit can receive address words designating locations in its internal read/write memory area, and to a data bus through which it can receive or transmit data to be written into or read from the memory locations designated by the address words; and a slave interface unit for connecting the processing unit to an address bus through which the processing unit can transmit memory addresses to an external memory area and to a data bus through which data to be written into or read from the external memory can be transmitted or received. Thus, the slave interface unit of a first processing unit may be connected to the master interface unit of a second processing unit by means of data and address buses in such a way that the first processing unit when in execution mode can access the internal read/write memory of the second processing unit when the latter is idle. Similarly the slave interface unit of the second processor unit may also be connected to the master interface unit of a third processor unit such that the second processor unit when in its execution mode can access the internal read/write memory of the third processing unit when the latter is idle. Thus any number of processing units may be connected together in a chain configuration.

Preferably, however, the external memory address capacity of the processing unit via its slave interface unit is substantially greater than the internal read/write memory address capacity that is accessible from outside via its master interface unit, thereby enabling a number of processing units to be connected to the slave interface unit of a single processing unit.

Preferably a part of said externally accessible internal read/write memory area is accessible also from the control section and is preferably provided by a separate memory device.

This part of the internal read/write memory area provides means whereby control data for controlling the operation of the processor can be written into the processing unit from outside, and which can also be read by the control section to derive the start instruction and initiate execution of a program. Furthermore, it enables the processing unit to be directly controlled by another processing unit of the same kind via their respective interface units.

Thus, if the slave interface unit of a first processing unit is connected to the master interface unit of a second processing unit, the first processing unit can access, for the purpose of writing control data into the part of the internal read/write memory area of the second processing unit which is accessible also to the control section thereof. The first processing unit can thus control the second processing unit, and similarly any other processing units whose master interface units are connected to its slave interface unit.

Preferably said part of the internal read write/memory area which is accessible to the control section, is accessible both during the idle and the execution mode of the processing unit, and the control section includes means for writing into it data indicating a change in the activity status, idle or executing, of the processing unit. This enables the activity status of a first unit to be monitored by a second processing unit which has access to the internal read/write memory area. Furthermore it enables the second processing unit to write new control data into the first processing unit whether the latter is in its idle or execution mode. This facility may be used to effect switching of the first processing unit between its idle and its execution modes eg to allow the second processing unit to access the read/write memory area of the first processing unit when the latter is in the middle of a program execution.

It will be apparent that the said part of the internal memory area which is accessible both to the control section and from outside via the (master) interface unit need only comprise a 1-bit memory word, one value (eg'0') indicating the idle mode and the other (eg '1') indicating the execution mode. This one bit may be written or read from outside for control and monitor purposes respectively; or written or read from inside by the control section on the one hand to provide an indication of the processor units activity status for external monitoring purposes, and on the other to enable the control section to respond to a change in the bit value to switch between modes.

Preferably however, the control section is capable of controlling the execution of a plurality of programs the sequential instructions of which are stored in a programmable read only memory (PROM) each having a different starting address in the PROM. In this case, the part of the internal read/write memory which is accessible both to the control section and from outside via the (master) interface unit will include, in addition to the above single status bit, address word bits into which the PROM start address for any one of the stored programs can be written from outside, and which can be read by the control section for program selection.

Although a processing unit in accordance with the invention can be used on its own to perform data processing operations, and in particular signal processing operations, the purpose of the invention is to provide a modular processing unit which may be connected to cooperate with one or more other processing units of the same kind in carrying out complex data processing operations requiring computing power greater than that which can be achieved using a single processor unit. In designing a multiple processor system for such applications using a number of processing units in accordance with the invention, each processing unit may be programmed to carry out a particular function, which function may include the designation of parts of that function to one or more other processing units and the control of those processing units in performing their particular functions. In addition, any of the processing units in the system may be given access, by means of its (slave) interface means, to external memory or input/output devices for example, to provide resources not available from the combination of several processors. The processing unit can access these other devices in the same way as it accesses the internal memories of other processing units. In the foregoing and in the following description it is to be understood that the processing unit remains live while in the idle mode and is defined to be "idle" only by virtue of the fact that, in this mode, the control section is not employed in controlling the execution of a program stored therein.

BRIEF DESCRIPTION OF THE DRAWINGS

The invention will now be described in greater detail, by way of example only, with reference to the accompanying drawings, of which.

DESCRIPTION OF THE PREFERRED EMBODIMENTS

Figure 1:
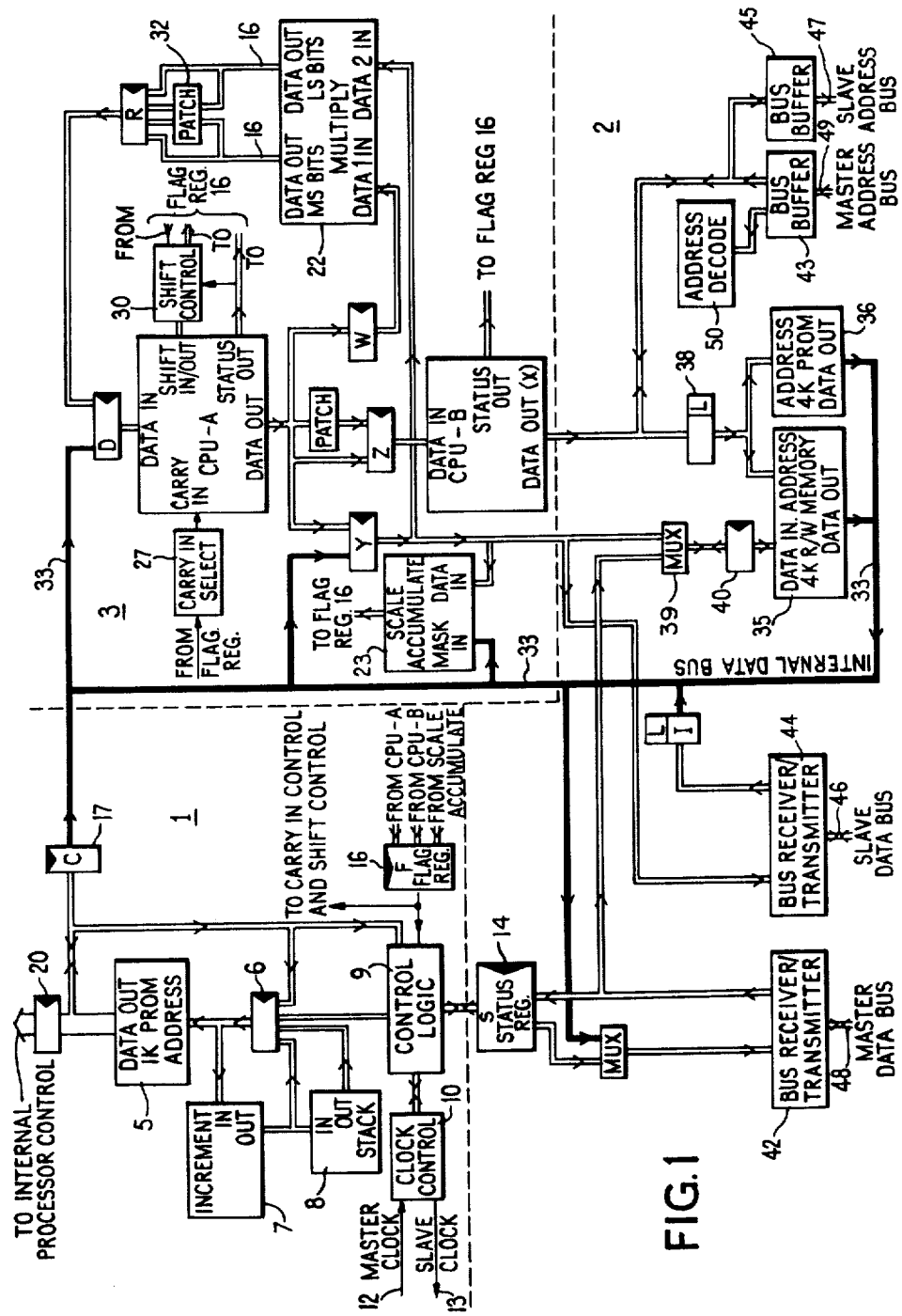
FIG. 1 is a block schematic diagram of a processor unit in accordance with the present invention.

Referring now to FIG. 1 of the drawings the processor unit is divided for convenience into three sections separated in the drawing by broken lines. These sections comprise a control section 1, containing a microcode memory in which one or more micro-programs which determine the function or functions of the processor unit are stored; a memory section 2 containing an area of read/write memory for storing variable data and an area of programmable read only memory (PROM) in which fixed data tables, such as sine and cosine look-up tables, can be stored; and a computation section 3 in which the mathematical data, memory address, and loop counting computations are performed in accordance with instructions from the microprogram.

The processor unit is also provided with two interface arrangements for connection to respective sets of data and address buses. The first of these interface arrangements, which will hereinafter be referred to as the slave interface arrangement (44,45) can be used to connect the processing unit to one or more other processing units of the same kind, to enable it to access the memory sections of, and to monitor and control the operation of those other (slave) processing units. This slave interface arrangement may also enable the processing unit to be connected to external memories or I/O latches.

The second of the interface arrangements, which will hereinafter be referred to as the master interface arrangement (42,43), enables the processing unit to be monitored and controlled, and have part of its internal memory section accessed from outside, eg from another (master) processor unit of the same kind. This is achieved by connecting the master interface arrangement of the processing unit to the slave interface arrangement of this other (master) processing unit.

Figure 3:
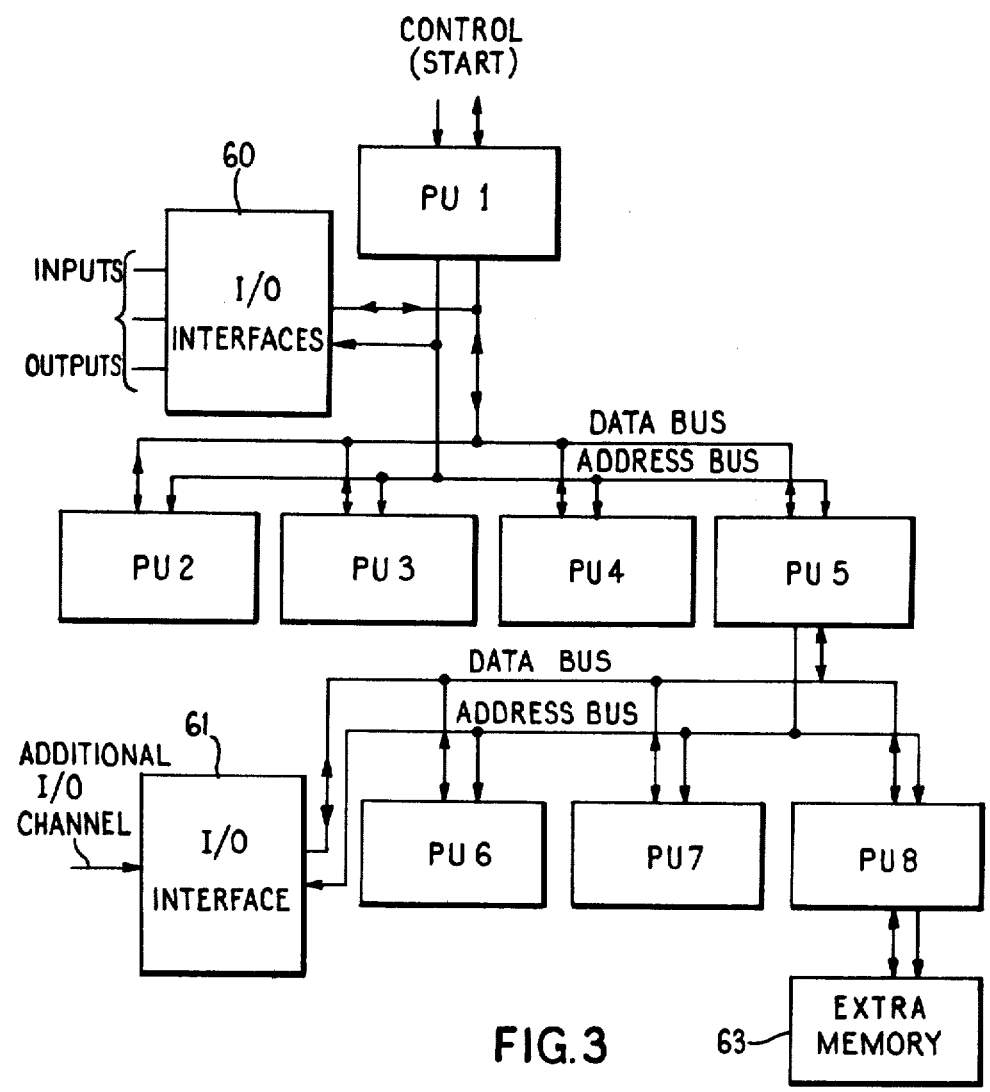
FIG. 3 is a block schematic diagram of a processor system incorporating a plurality of processor units of the kind shown in FIG. 1.

Thus, a number of processor units may be connected together in master/slave relationships to form a 'tree' structure by interconnecting the master interface arrangements of some of the processing units with the slave interface arrangements of others as illustrated schematically in FIG. 3. As indicated earlier, a number of processing units may be connected as slaves to a common master, but a slave processing unit will normally be connected to only one master processing unit. Furthermore, a processing unit which is connected as a slave to a master processing unit may also be connected as a master to one or more slave units.

The data and address bus set which interconnects the slave interface arrangement of a master processing unit with the master interface arrangement of each of its slave processing units enables it to monitor the operation of the slave to determine whether it is idle or whether it is executing a program, these being the only two modes of which a processing unit is capable. The same data and address bus set also enables the master processing unit to independently switch any one of its slave processing units from its idle to its execute mode, ie to start the slave unit, or to switch it from its execute to its idle mode, ie to stop the slave unit. When switching from idle to execute, the master may also select which of the slave's microprograms is to be executed. When the slave is in its idle mode, typically before it commences execution of a microprogramme or when it has completed execution of a microprogram on a particular block of data, the master may access the slave's internal memory section, either to write data into, or to read data from it. The data read from (or written into) the slave's memory section may be transferred to (or from) the master's own internal memory section, the internal memory section of another one or more of its slaves, or from an external memory or I/O latch to which the master's slave interface arrangement is connected.

A typical sequence of operation would begin with a master in execution mode and its slaves idle. In this situation the master may write data into its slaves' memory sections, select appropriate programs within the slaves' microcode memories, and then switch them to execution mode. The master may continue in execution mode and then monitor the status of its slaves until they have completed execution of their respective programs on the data which was supplied to them, and again become idle. The master may then access the slaves' memory sections either to copy the results of slaves' computations into its own memory section, or to transfer intermediate data from one slave to another. While the slaves are in execution mode, they may themselves become masters controlling their own slaves at the next level down in the tree structure.

The top processing unit of the tree structure will normally be connected to a host minicomputer which will thus have overall control of the whole multiple-processor system, and be able to supply input data to, and read output data from, the system via this top processing unit. Additionally input/output of data may be achieved by means of I/O latches connected at appropriate locations within the tree structure.

Thus a processing unit may either be used on its own, or a complex multiple processor system suitable for special purpose signal processing applications may be constructed from a number of identical processing units each adapted to perform a specific function or functions determined by its particular microprogram(s).

A more detailed description of an individual processing unit in accordance with the invention will now be given with reference to FIGS. 1 and 2 of the accompanying drawings. For the purposes of this description it will be assumed that the processing unit is connected as one of a number of slaves to one other processing unit, and is connected as a master to a number of its own slave units.

The control section 1 of the processing unit is built around a microcode memory in the form of a programmable read only memory 5 (PROM) of 1K, 72 bit wide micro-instruction words. Each micro-instruction word represents one step in a microprogram, of which up to 16 may be stored in the PROM, and is largely horizontally coded enabling the various parts of the processing unit to be operated in parallel as will be described below.

Under normal sequential program execution a 10-bit word latched in an address register 6 and designating the address of a micro-instruction word in the PROM 5 is incremented by 1 each cycle so that the micro-instruction words of successive PROM addresses are executed in sequence. Incrementing of the 10-bit PROM address word is effected by an increment counter 7 which, in successive cycles, adds 1 to the numerical value of the address word of the preceding cycle held in the address register 6, and feeds the new address word back into it.

The processing unit is however capable of non-sequential program execution, in which a part of the micro-instruction word can be used to instruct the processing either to 'jump', 'call', 'return' or 'stop'. The 'jump' instruction overrides the increment counter 7 and causes a new 10-bit PROM address word, contained in the same 72-bit micro-instruction word as the 'jump' instruction itself, to be written into the address register 6 so that the program continues normal sequential execution from the new address (at least until a further non-sequential instruction appears). The program may thus be made to 'jump' from and to any micro-instruction word stored in the PROM 5.

The 'call' instruction is used in conjunction with the 'return' instruction, and is similar to the 'jump' instruction in that it causes the program to jump to a new micro-instruction word designated by a 10-bit PROM address word contained in the same micro-instruction word as that which executes the call instruction. The 'call' instruction, however, is always followed at some later stage in the program sequence by a 'return' instruction which causes the program to return to the micro-instruction word succeeding that which contained the original 'call' instruction. Thus, when a 'call' instruction is executed, the 'return' address is taken from the increment counter 7 and is stored in a stack 8 (last-in-first-out buffer) which will allow the nesting of return addresses up to 4 deep. Thus up to three additional 'call' and 'return' instructions may be executed between the first occuring 'call' instruction and its associated 'return' instruction.

Finally, the fourth program instruction which may be used to alter the normal sequential operation of the program is the 'stop' instruction which simply changes the operating mode or status of the processor unit from running to idle, following which its memory section 2 may be accessed from outside as discussed earlier.

Excution of each of the four sequence-control instructions described above may be conditional upon the value of a 1-bit flag register 16, the conditionality being determined by one bit in the micro-instruction word.

The control section 1 of the processing unit also includes control logic circutry 9, and a clock control unit 10.

The clock control unit 10 is controlled via a clock line 12, by the clock control unit of its master processor unit, and the clock control units of its slave units are controlled by the control unit 10 via clock line 13. The clock control unit 10 determines the cycle time of the processing unit via the control logic circuit 9.

The control logic circuitry 9 also performs several other functions. It is used to override any one of the four sequence control instructions when such instructions are conditional upon the value of the 1-bit flag register 16 and when the flag register bit is set at '0'. It also provides the control section 1 with access to a status register 14 which effectively forms part of the memory section 2 of the processing unit, and which is accessible also from outside via the master interface arrangement. The status register 14 provides the means whereby the operation of the processing unit can be controlled and monitored from outside eg by its master processing unit, and contains 6 bits, S1 to S6 as follows:

| S1 | Activity status |
| --- | --- |
| 0 | idle |
| 1 | executing |
| S2 | Data distribution status |
| 0 | disabled |
| 1 | enabled |
| S3-S6 | 4-bit start address on processor initiation |

Before initiation of a program, ie while the processing unit is idle and bit S1 reads '0', the 4-bit PROM address of the first micro-instruction word of the program is written by the master processing unit into bits S3 to S6 of the status register 14 (the PROM may thus contain up to 16 microprograms having start addresses 1 to 16 respectively) and sets bit S1 to '1' to initiate execution of the program. The control logic circuitry will then respond to the change in the status bit S1 from '0' to '1' to begin execution of the program reading its first PROM instruction address from bits S3 to S6 into the address register 6. The master unit may then poll the status bit S1 until it is cleared to '0' by the control logic circuitry 9 upon execution of a 'stop' instruction in the microprogram.

The master may also stop execution of the program at any time by clearing bit S1 to '0', eg to enable it to access the memory section 3 of the processor unit as will be described later.

Bit S2 enables the master to control a distribution mode of transfer either from the master to all slaves which have their S2 bits set at '1', or from one slave to any of the other slaves which have their S2 bits set at '1' as will also be discussed later.

The internal operation of the control section 1 is determined by 17 bits (P1 to P17) of each micro-instruction word as follows. The first bit, P1, determines the interpretation of bits P2 to P17 as either a data word or as a sequence control instruction.

| P1 | Sequence control operation |
| --- | --- |
| 0 | Normal sequential operation; P2-P17 is data word. |
| 1 | Sequence control instruction according to P2-P15 |

If P1 in the micro-instruction word is '1', then P2 to P15 consists of a sequence control instruction which controls the processor operation as follows:

| P2,P3 | Type of operation |
| --- | --- |
| 0 | Jump |
| 1 | Call |
| 2 | Return |
| 3 | Stop |
| P4 | Conditionality |
| 0 | Unconditional |
| 1 | Conditional according to P5 |
| P5 | Condition |
| 0 | if flag bit F = 0 |
| 1 | if flag bit F = 1 |
| P6-P15 | 10-bit destination address for jump or call |

Alternatively, if P1 is '0' in the micro-instruction word, then P2 to P17 consists of a 16-bit data constant word which is latched into register 17 to provide a constant for the computation section 3.

The remaining bits of the micro-instruction word, bits P18 to P72 are latched into a register 20 and used to control various parts of the memory and computation sections of the processor unit via internal control lines (not shown).

The computation section 3 of the processor unit is controlled by bits P18 to P68 of the micro-instruction word and includes two computational units designated CPU-A and CPU-B in FIG. 1. CPU-A provides the main computational unit in which most of the mathematical data calculations are performed, while CPU-B is used only for address calculations and loop counting. Both CPUs are constructed from identical commercially available 4×4-bit (ie operating on 16-bit words) CPU slices fabricated using large scale integration (LSI) microprocessor technology. The CPUs described here and shown in FIG. 2 by way of example are type Am 2901 manufactured by Advanced Micro Devices Inc., of Sunnyvale, Calif. USA. The computation section also includes a multiplication unit 22 for performing multiplications, and a scale accumulation unit 23 which enables a check to be maintained on the data being transferred into the memory section 2. This gives warning of close-to-overflow conditions, enabling preventive scaling to be done when the data is next accessed. A number of registers D,R,Y,Z, and W are also provided for routing data between various parts of the compution section 1 and the memory section 3.

Figure 2:
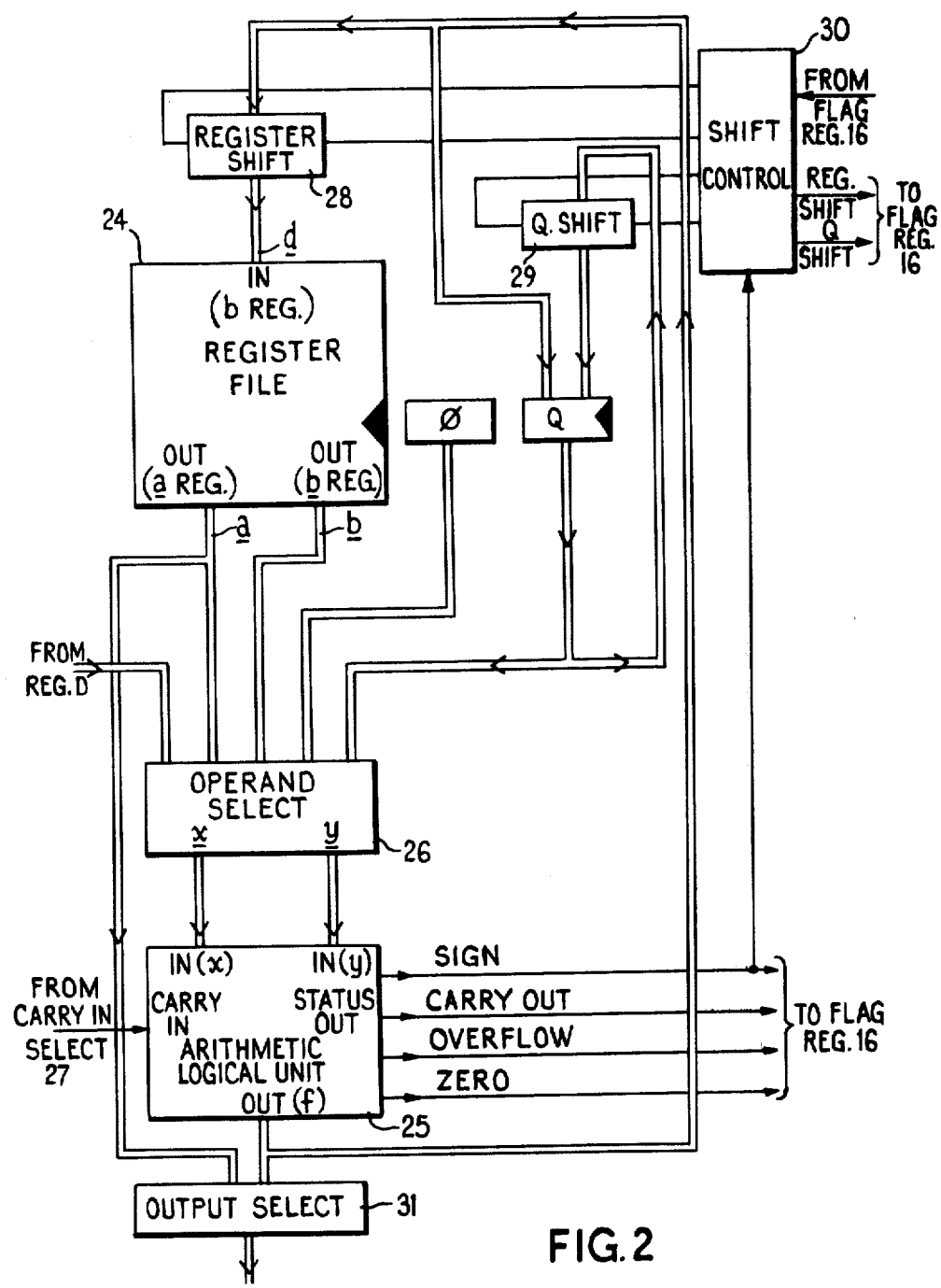
FIG. 2 is a block schematic diagram of part of the processor unit of FIG. 1.

FIG. 2 shows the main computation unit, CPU-A, in greater detail, and it includes a file 24 of 16 general purpose 16-bit registers and two special purpose registers Q and φ the latter of which simply provides the operand zero. The register file has two outputs a and b through which the contents of any two registers of the file designated a reg and b reg may be read, and one input d through which data may be read into the register (b reg) associated with output b. The two 4-bit addresses which specify these two registers a reg, b reg are contained in the micro-instruction word.

CPU-A also includes an arithmetic/logical unit 25 which takes two operands x,y, selected by an operand select unit 26 from various sources determined by bits of the micro-instruction word, and performs on them add, subtract and logical operations again determined by the micro-instruction word, to produce a function result f. The sources from which the operand select unit 26 may select the two operands x,y are the two output registers a reg, b reg of the register file 24, register $\phi$, register Q, and the external register D through which all input data enters CPU-A.

In addition to the output function f, the arithmetic/logical unit 25 also makes available four status bits designated SIGN, CARRY-OUT, OVERFLOW and ZERO for storage in the flag register 16 of the control section 1. The SIGN status bit indicates the sign (+ or − in two's complement notation) of the output function value f; the CARRY-OUT bit is the carry bit resulting from an addition or subtraction operation; the OVERFLOW bit is the bit produced in the event of an overflow condition resulting from an arithmetic operation, and the ZERO bit indicates a zero value for the OUTPUT function f.

The arithmetic/logical unit 25 is also associated with a carry-in select circuit 27 which is used to select a carry-in bit, eg the CARRY-OUT or OVERFLOW status bit, from the flag register 16 when appropriate for add and subtract operations thus enabling multi-word arithmetic operations to be performed.

Also included in CPU-A are two shift networks 28,29 which are controlled by a shift control unit 30. The shift network 28 is for performing 1-bit left or right shifts in the data word (output function f) being entered into the selected input register b reg of the register file, and the shift network 29 is for performing 1-bit left or right shifts in the data word stored in register Q. The shift control unit 30 determines which bits are to be shifted in, and makes the bits shifted out available for storage in the flag register 16.

The output word from the CPU-A is selected by an output select unit 31 from either the output function f of the arithmetic logic unit 25, or the first output register a reg of the register file 24. The output function f from the arithmetic logic unit 25 may also be written into the input register b reg of the register file 24, or the register Q, or both.

The operation of the various parts of CPU-A described above are controlled by a total of 20 bits, P18 to P37, from the micro-instruction word. The first 8 of these bits determine the two register file addresses as follows:

| P18–P21 | First address (areg) in register file |
|---|---|
| P22–P25 | Second address (breg) in register file |

The next three bits control the selection of the two operands x and y for the arithmetic/logical unit 25 in accordance with one of the following eight combinations:

| P26–P28 | First operand (x) | Second operand (y) |
|---|---|---|
| 0 | areg | Register Q |
| 1 | areg | breg |
| 2 | Register $\phi$ | Register Q |
| 3 | Register $\phi$ | breg |
| 4 | Register $\phi$ | areg |

| P26–P28 | First operand (x) | Second operand (y) |
|---|---|---|
| 5 | Register D | areg |
| 6 | Register D | Register Q |
| 7 | Register D | Register $\phi$ |

The carry-in bit (c) to the arithmetic/logical unit is selected by the next bit:

| P29 | Carry in (c) |
|---|---|
| 0 | 0 |
| 1 | flag bit | and the next three bits of the micro-instruction word determine which of the following eight possible functions is to be performed by the arithmetic/logical unit 25 as follows:

| P30–P32 | Function value (f) |
|---|---|
| 0 | x + y + c |
| 1 | y − x − c |
| 2 | x − y − c |
| 3 | x or y |
| 4 | x and y |
| 5 | $\bar{x}$ and y |
| 6 | x xor y |
| 7 | x $\overline{xor}$ y |

Here $\bar{x}$ denotes the bit-complement of x, xor is the exclusive-or operation, and $\overline{xor}$ gives the bit-complement result of xor.

The next three bits of the micro-instruction word control the shift operations of the two shift networks 28,29 and the destination of the output function f (to register b reg or register Q), and also select the output word from CPU-A (either f or the contents of register a reg) as follows (a dash means no charge):

| P33–P35 | Register file results (breg) | register Q result | Output word |
|---|---|---|---|
| 0 | — | f | f |
| 1 | — | — | f |
| 2 | f | — | areg |
| 3 | f | — | f |
| 4 | f shifted left | Q shifted left | f |
| 5 | f shifted left | — | f |
| 6 | f shifted right | Q shifted right | f |
| 7 | f shifted right | — | f |

As mentioned above, the shift-out bits are made available for storage in the flag register 16, while the shift-in bit (the same bit for the f shift associated with the input d to register b reg and the register Q) is determined as follows:

| P36,P37 | Shift-in bit |
|---|---|
| 0 | 0 |
| 1 | 1 |
| 2 | sign of f |
| 3 | flag bit |

The sign of f shift-in bit is derived from the SIGN status bit produced by the arithmetic/logical unit 25.

The second computational unit, CPU-B in FIG. 1 is substantially indentical to CPU-A shown in FIG. 2, but only a subset of the functions are used. Its 16 general purpose registers in its register file are all available, but its register Q is ignored, as are the shift networks and the carry-in-select, and the arithmetic/logical unit is restricted to add and subtract functions only.

CPU-B takes its input from the register Z which in turn takes as its input the output word from CPU-A, either directly or via a patch field which may be wired specially to provide a 16-bit permutation of the data. Its output word is used for memory addressing in the same instruction cycle as the address is calculated.

The operation of CPU-B is controlled by 12 bits of the micro-instruction word, P38 to P49. The first 8 bits provide the two register file addresses, i reg, j reg

| P38-P41 | First address (i reg) in register file |
| --- | --- |
| P42-P45 | Second address (j reg) in register file | and the next two bits control the selection of the two operands s, t as follows:

| P46,P47 | First operand (s) | Second operand (t) |
| --- | --- | --- |
| 0 | i reg | j reg |
| 1 | Register $\emptyset$ | i reg |
| 2 | Register Z | i reg |
| 3 | Register Z | i reg |
|   |   | Register $\emptyset$ |

The next bit P48, determines which of two functions is to be performed by the arithmetic/logical unit on the two operands, and bit P49 determines the CPU-B output word (always the output function g of the arithmetic/logical unit) and the destination of the output function g.

| P48 | Function value (g) |
| --- | --- |
| 0 | s + t |
| 1 | t + s |

| P49 | Register file result (j reg) | Output word |
| --- | --- | --- |
| 0 | — | g |
| 1 | g | g |

The multiplication unit 22 takes two 16-bit signed input words in two's complement notation from the registers Y and W respectively, and calculates a 32-bit signal product. A 16-bit result is selected from the bit product as follow. Two standard selections are provided: the least significant 16 bits (bits 0 to 15) and the most significant 16 bits (bits 16 to 31). Two additional selections may be made using a patch field 32 specially wired as required. The facility is also provided for automatic rounding of the 16-bit result by adding a '1' in the appropriate bit position (eg bit 15 for the most significant 16 bits result).

The selected 16 bit result from the multiplication unit is written into register R and may then be transferred in a subsequent instruction cycle to register D for processing in CPU-A.

The operation of the multiplication unit 22 is controlled by 4 bits, P50 to P53, of the micro-instruction word as follows:

| P50,P51 | Multiply result selection |
| --- | --- |
| 0 | Least significant 16 bits |
| 1 | Patch 1 |
| 2 | Patch 2 |
| 3 | Most significant 16 bits |
| P52 | Multiply rounding |
| 0 | No rounding |
| 1 | Round |
| P53 | Multiply enable |
| 0 | No-op |
| 1 | Multiply |

The scale accumulation unit 23 is provided to maintain a check on the most significant bits of data being written from the register Y to the memory section 2. The register Y may receive data either from CPU-A or from an internal data bus 33 (shown as a solid bus line in FIG. 1) which also provides a source of data from the register D and the scale accumulation unit 23. The data on the internal bus may itself come either from the register 17, which provides a constant for the computation section, or from the memory section 2 of the processor unit.

The purpose of the scale accumulation unit 23 is to warn of close-to-overflow conditions enabling preventive scaling to be effected when the data is next accessed. The unit contains two 6-bit mask registers (not shown) in which two different threshold values derived from the low-order 12 bits of the 16-bit data word on the internal data bus 33 taken from the constant register 17, are stored. The threshold value stored in the first mask register corresponds to the high order 6 bits (bits 15 to 10) of the data word being transferred from the register Y to the memory section 2, while that stored in the second mask register corresponds to bits 14 to 9. The two 6-bit data word values are each compared with the appropriate 6 bit threshold value to produce respective status bits indicating whether the values of the data word bits are above or below their threshold values. The two status bits are made available for storage in the flag register 16 and can be used to indicate whether the data word value lies above the higher threshold value, below the lower threshold value or between the two threshold values.

The unit operates in two modes, one for signed data and one for unsigned data. In the unsigned mode, the operation for each mask register is as follows: the 6 bits of the mask are ANDed with the appropriate 6 bits of the data word to produce a 6-bit result, and these 6 bits are then ORed together and with the corresponding existing status bit to give a new status bit. Thus the status bits are updated although the mask register values remain unchanged. In the signed mode, the bits of the data are first XORed with the sign bit and then operation continues as for the unsigned mode.

The operation mode, signed or unsigned, is determined by an initialization instruction contained in the micro-instruction word. At initialization, the two status bits are cleared and the two mask registers loaded from the internal data bus 33. Subsequent updating of the status bits in the selected mode is effected by an 'update enable' instruction from the micro-instruction word. The instructions controlling the scale accumulation unit 23 are contained in bits P54, P55 of the micro-instruction word as follows:

| P54,P55 | Scale accumulator operation |
|---|---|
| 0 | No-operation |
| 1 | Enable update of status bits |
| 2 | Initialize for signed mode |
| 3 | Initialize for unsigned mode |

The next 13 bits, P56–P68, of the micro-instruction word control the routing of data and various status bits between various parts of the register. In particular they control the source and destination of data and status bits which are written into or read out of a number of registers, namely registers D,Y,Z,W and the flag register. They also control the source and destination of data entered onto the internal data bus 33. Data may be entered onto the internal bus either from the constant register 17, the processor unit's internal memory or from an external memory via a register I.

The flag register 16, and registers D,Y,Z and W are controlled by clock bits and select bits from the micro-instruction word, the clock bits determining whether a register retains its current value, or has new data clocked into it and the select bits determine which data is entered.

The micro-instruction word controls the above registers and internal data bus as follows:

| P56 | Y register select |
|---|---|
| 0 | data bus |
| 1 | CPU-A output |
| P57 | Y register clock |
| P58 | Z register select |
| 0 | CPU-A output |
| 1 | Patched CPU-A output |
| P59 | Z register clock |
| P60 | W register clock |
| P61 | D register select |
| 0 | data bus |
| 1 | multiply output (R) |
| P62 | D register clock |
| P63,P64 | data bus loading |
| 0 | C register (constant from micro-instruction) |
| 1 | internal memory data |
| 2 | I register (from external memory) |
| 3 | — |
| P65–P68 | Flag register, F, select and clock |
| 0 | CPU-A register shift out |
| 1 | CPU-A register shift out |
| 2 | CPU-A Q shift out |
| 3 | CPU-A Q shift out |
| 4 | Constant 1 |
| 5 | Constant 1 |
| 6 | Constant 0 |
| 7 | No-op (current value retained) |
| 8 | CPU-A carry out |
| 9 | CPU-A overflow |
| 10 | CPU-A sign of function value |
| 11 | CPU-A zero function value |
| 12 | CPU-B zero function value |
| 13 | CPU-B carry out |
| 14 | Scale accumulator first mask |
| 15 | Scale accumulator second mask |

The memory section 2 of the processor unit includes an internal read/write memory 35 of 4K words (address range 0 to 4095) for storing variable data, and a PROM 36 also of 4K words (address range 4096 to 8191) for storing data constants and tables, eg sine and cosine values. This section of the processor unit also includes the above-mentioned master interface arrangement, comprising a master data bus receiver/transmitter 42 and a master address bus buffer 43, and the slave interface arrangement comprising a slave data bus receiver/transmitter 44 and a slave address bus buffer 45.

When the processor unit controls one or more slave units, its slave data bus receiver/transmitter 44 and its slave address bus buffer 45 are connected respectively by means of a 16-bit slave data bus 46 and a 16-bit slave address bus 47, to the master data bus receiver/transmitter 42 and the master address bus buffer 43 of each slave. Similarly, when the processor unit is itself a slave unit (it may also be a master controlling its own slave units), its master data bus receiver/transmitter 42 and its master address bus buffer 43 are connected respectively, by means of a 16-bit master data bus 48 and a 16-bit master address bus 49, to the slave data bus receiver/transmitter 44 and the slave address bus buffer 45 of its master.

The internal memories 35,36 of the processing unit may be addressed via a latch register 38 by the output word of CPU-B. The output word of CPU-B may also be used to address the internal read/write memories 35 of any slave units (or other external memories to which it is connected) via the slave address bus buffer 45 and slave address bus 47. Data read from either of the internal memories 35,36 is entered onto the internal data bus 33. Data being written into the read/write memory 35 (data cannot be written into the PROM 36) derives either from the register Y or from outside, eg from the master processing unit or another external memory via the master data bus 48 and master data bus receiver/transmitter 42. Data from either of these sources is transmitted to the internal read/write memory 35 via a multiplexer 39 and latch register 40.

The memory address operation is controlled by a single bit, P69, of the micro-instruction word as follows:

| P69 | Internal memory operation |
|---|---|
| 0 | read only |
| 1 | read then write |

Thus a read operation is always performed, although the data read may or may not be selected for entry onto the internal data bus 33 according to micro-instruction word bits P63,P64. When the write operation is enabled, this is done after a read operation so that in a read and write instruction, the data read is the old contents of the memory address.

In communications between a master and its slaves, the top 4 bits of the 16-bit slave address bus 47 are used to designate a particular slave (there may therefore be up to 16 slaves connected to one master) and the appropriate slave unit recognizes these 4 bits in an address decode unit 50 associated with its master address bus buffer 43. The remaining low order 12 bits of the slave address bus 47 determine the address in the slave's internal read/write memory 35 (the master cannot access a slave's PROM 36). Thus, the internal read/write memories of up to 16 slave units appear as a single external address space of up to 64K words (16×4K words read/write memory).

Data may either be written into or read from the selected address in a slave's read/write memory, via the slave data bus 46, but this may only be done when the slave is idle, ie when bit S1 of its status register 14 is '0'. A slave's status register 14 may however be accessed at any time for monitor and control purposes. When accessing a slave's status register the same 16-bit slave data and slave address buses 46,47 are used, although only the top 4 bits of the slave address bus, designating a particular slave, and the low order 6 bits of the slave data bus (corresponding to the 6 bits of the status register) are relevant.

A distribute function is provided for writing the same data unit into several slave's read/write memories simultaneously (at the same address in each). When the distribute function is specified by the micro-instruction word of the master processor unit (discussed below) all slaves having their status register S2 bits set at '1' will accept data regardless of the top 4 bits on the master's slave address bus 47 (which is connected to the master address buses 49 of its slaves).

Control of the master/slave communications is determined by bits P70 to P72 of the micro-instruction word as follows:

| P70-P72 | communications functions |
| --- | --- |
| 0 | write to slave's status register |
| 1 | read from slave's status register |
| 2 | write to slave's memory |
| 3 | read from slave's memory |
| 4 | no-op |
| 5 | no-op |
| 6 | distribute data to several slaves' memories |
| 7 | read data from one slave and distribute to several |

Each of these communications functions actually takes two operating cycles to complete.

In a master-to-slave write operation, the data, taken from the master's register Y, and the address, taken from CPU-B, are sent in cycle 1 to the slave across the master's slave data bus 46 and slave address bus 47 respectively, and enter the slave via the slave's master data bus receiver/transmitter 42 and master address bus buffer 43. In cycle 2 the slave uses the data and address to perform the write into its read/write memory 35 or status register 14 as appropriate.

In a master/slave read operation, the address from CPU-B of the master is sent to the slave's master address bus buffer 43 across the master's slave address bus 47 in cycle 1. In cycle 2 the slave uses the address to read the data from its internal read/write memory 35, enters it on the internal data bus 33 and transfers it to the master via its master data bus receiver/transmitter 42 and master data bus 48. The data arrives at the master's register I, via its slave data bus receiver/transmitter 44, early enough in cycle 2 to be selected for entry onto the master's internal data bus 33 according to bits P63,P64 of its micro-instruction word.

A slave's status register 14 may similarly be read by a master using the same data and address buses.

It will be seen that there is a potential clash in use of the master-to-slave data bus 46 when a read instruction to a slave is immediately followed by a write instruction. This clash is resolved by giving the outgoing write data precedence over the incoming read data from the slave. Thus, the read data is lost, resulting in the master's register I containing the write data which is then entered onto the internal data bus as for a normal read operation.

Since the internal and external (communications) memory functions can be carried out simultaneously, it is possible for block transfers of data (ie groups of data words) between a master and slave(s) to be performed at the rate of one data word per instruction cycle.

For block transfer of data from master to slave(s) a data word (N) is read from an address (u) in the read/write memory 35 of the master specified by the output word of its CPU-B, and routed to its register Y in the first cycle. In the second cycle a new address (u+1) is generated by the master's CPU-B and used to read out another data word (N+1) from the master's memory 35 which is transferred to the master's register Y as before. Also during the second cycle, the data word N from the register Y is transmitted to the slave(s) together with the new address word (u+1) and is written into the read/write memory 35 of the slave(s) at an address word (u+1). Thus, the destination in the slave(s) is offset by one from the master's source address.

For block transfer of data from slave to master, the slave's address is sent to the slave in one cycle, the data from that address returns to the master's register I then Y in the next cycle, and is written into the master's memory in the third cycle. Again, as these 3 cycle operations overlap, the net result is that the destination address in the master is offset by two from slave's source address.

Block transfer of data from one slave to other slaves may also be effected using the read and distribution functions. Data is read from a read/write address in the slave specified by the top 4-bits on its master address bus 49 in one cycle, and written into the same address in the read/write memories of all slaves which have their status register 52-bits set at '1' in the following cycle. The destination address is offset by one from the source address.

Thus each processing unit is responsive on receipt of a single starting instruction entered into its status register 14 to perform the execution of a stored microprogram selected by the starting instruction. The activity status, idle or executing can be continuously monitored from outside to ascertain when the unit has completed execution of the program, following which results of its computations can be recovered from it. While executing the program, the processing unit may control and monitor, and access and transfer data between the internal read/write memories 35 of, its slave processing units. Thus, a processing unit, in execution of a program, may delegate functions to each of its slaves by transferring data to their read/write memories, initiating their program execution on that data, and then recovering the results of those computations when completed.

A typical multiple-processor system configuration incorporating a plurality of substantially identical processing units in accordance with the invention is shown in FIG. 3, illustrating the manner in which the processing units can be interconnected to perform complex signal processing problems requiring computing power greater than that which can be achieved using a single unit.

The configuration starts at the top of the tree with a first processing unit PU1 whose master interface arrangement is connected by means of a data and address bus set to a host minicomputer (not shown) which controls the overall operation of the system via the top unit PU1. The host mini-computer need access only the status register 14 of PU1 in order to initiate and monitor its operation, although in practice it may also provide input and output of data to and from the read/write memory of PU1.

The slave interface arrangement of PU1 is in turn connected by a data and address bus network to the master interface arrangements of each of four slave processing units PU2 to PU5, and to an input/output (I/O) interface unit 60. When in its execution mode, PU1 may communicate with the I/O interface unit to load data into its own internal read/write memory 35, transfer data between the I/O interface unit and any one or all of its slave units PU2 to PU5, transfer data from its own read/write memory to that of any one or all of its slaves, or transfer data between any combination of its slaves via the data and address bus network. Writing of data into or reading of data from any of the slaves can only be done while the particular slave or slaves concerned are idle. The same data and address bus network is used by PU1 to control and monitor the operation of the slave units PU2 to PU5 by addressing their status registers.

In the same manner as PU1 is connected to slaves PU2 to PU5, and to the I/O interface unit 60, the slave unit PU5 is itself connected to an I/O interface unit 61, and its own set of three slaves PU6 to PU8, and the same considerations regarding control, monitoring and inter-communications apply. The third of these slaves PU8, has its slave interface unit connected to an external memory 63 effectively providing the system with an increased memory workspace. The size of this memory may be as large as the 16-bit address word capability of its slave interface arrangement will allow, ie 64K words.

While it has been found convenient to use a separate memory device, ie the status register 14, to provide the means whereby the processing unit can be controlled and monitored from outside, this memory space may alternatively be provided by a part of the externally accessible read/write memory area provided in the example by the read/write memory 35. This part of the internal read/write memory may then be accessed from outside via the master interface arrangement, for the purpose of writing control instructions to, and for monitoring the status of, the processing unit. In such an arrangement, the control section will also be able to access this part of the internal read/write memory for the purpose of reading control instructions previously written into it from outside, and writing into it data relating to the operating status of the processing unit for monitoring purposes.

Furthermore, communications to and between processing units for these control and monitor purposes may be effected by a separate control bus arrangement. Each processing unit will then have a separate interface arrangement solely for use in transmitting control instructions to, and receiving data relating to the operating status of, any slave processing units to which it is connected; and for receiving control instructions from and transmitting data relating to its operating status to, its controller, eg its master processing unit.

I claim:

1. A data processing unit comprising:
   a control section responsive to a control instruction to switch the processing unit from an idle mode to an execution mode, the control section being operative during the execution mode to initiate and control the sequence of execution of a program stored therein and to automatically switch the processing unit to the idle mode in which the control section is no longer operative to initiate and control the sequence of execution of a program stored therein,
   a memory section including an area of read/write memory,
   a computation section for performing calculations in accordance with instructions from the program and capable of accessing the read/write memory area during execution of the program,
   interface means having access to the area of read/write memory through which the processing unit is able to access an external memory when in its execution mode, through which at least part of the read/write memory area of the processing unit is able to be accessed from outside when in its idle mode and through which said control instruction for switching the processing unit from its idle to its execution mode is able to be received from outside;
   a predetermined part of the read/write memory area of the memory section which is accessible from outside via the interface means being adapted to receive said control instruction, and the control section including means for responding to the control instruction in the predetermined part of the read/write memory area,
   the interface means comprising a master interface means including a master address bus through which the processing unit is able to receive address words designating locations in its read/write memory and a master data bus through which the processing unit is able to receive or transmit data to be written into or read from the memory locations designated by said address words, through which a predetermined part of the externally accessible read/write memory area is able to be accessed from outside for control and monitor purposes when the processing unit is in both its idle and execution modes, and through which the remaining part of the externally accessible read/write memory area is able to be accessed from outside only when the processing unit is in its idle mode,
   and slave interface means including a slave address bus through which the processing unit is able to transmit memory addresses to an external memory area and a slave data bus through which data to be written into or read from the external memory is able to be transmitted or received, through which the processing unit is connectable to access the external memory area only when in its execution mode.

2. A data processing unit as claimed in claim 1 wherein said predetermined part of the externally accessible read/write memory area is adapted to be accessed both from outside via the master interface means and by the control section during both the idle and the execution modes of the processing unit, and the control section includes means for writing into it data indicating a change in the current activity status, idle or executing, of the processing unit, and for reading from it control instruction data indicating a required change in the activity status, idle or executing, of the processing unit written into said predetermined part of the read/write memory area from outside via the master interface means, whereby to enable the activity status of the processing unit to be monitored and controlled from outside via the interface means.

3. A processing unit as claimed in claim 2 wherein the activity status of the processing unit is indicated by a one-bit binary work location in said predetermined part of the read/write memory area, one value of which indicates the idle mode and the other value of which indicates the execution mode of the processing unit.

4. A processing unit as claimed in claim 2 or claim 3 wherein the control section is capable of controlling the execution of either one or one of a plurality of programs the sequential instructions of which are stored in programmable read only memory (PROM), each program having a different starting address within the PROM, the predetermined part of externally accessible read/write memory area including a memory location into which control instruction data indicating the starting address of one of said programs can be written from outside via the master interface means as part of said control instruction, and from which this data can be read by the control section for program selection.

5. A data processing unit as claimed in claim 1, 2 or 3 wherein said predetermined part of the externally accessible read/write memory area is provided by a separate memory device.

6. A data processing unit as claimed in claim 1 wherein the external memory address capacity of the unit via the slave interface means is substantially greater than the internal read/write memory area accessible from outside via the master interface means.

7. A data processing system comprising a plurality of data processing units each as claimed in claim 1 wherein the slave interface means of a first of said processing units is connected to the master interface means of each of one or more other processing units, whereby the first processing unit, when in its execution mode, is able to access the externally accessible internal read/write memory area of the or each of the other processing units which effectively constitute an external memory area for the first processing unit.

8. A data processing system as claimed in claim 7 wherein the slave interface means of at least one of said other processing units is connected to the master interface means of at least one further processing unit individually associated with it, whereby the externally accessible internal read/write memory area of the or each of said other processing units effectively constitutes an external memory area accessible to the said other processing unit to which it is connected.

9. A data processing system as claimed in claim 7 or 8 wherein the externally accessible internal read/write memory areas of processing units which have their master interface means connected to the slave interface means of a common processing unit each constitute a separately identifiable section of the external memory address capacity of the common processing unit to which they are connected.

10. A data processing system as claimed in claims 7 or 8 wherein the interconnection between any processing units which have their master interface means connected to the slave interface means of a common processing unit comprises a commmon address bus through which the common processing unit is able to transmit address words designating memory locations in the externally accessible read/write memory areas of the processing units to which its slave interface means is connected, and the master interface means of each of said processing units includes means for decoding said address words to determine whether the designated memory location lies within its internal read/write memory area, the interconnection further comprising a common data bus through which the common processing unit is able to write data into or read data from the memory locations designated by the address words.

* * * * *